(12) United States Patent
Sargsyan

(10) Patent No.: US 11,773,831 B1
(45) Date of Patent: Oct. 3, 2023

(54) RENEWABLE ELECTRICITY GENERATING SYSTEM

(71) Applicant: Arsen Sargsyan, Brooklyn, NY (US)

(72) Inventor: Arsen Sargsyan, Brooklyn, NY (US)

( * ) Notice: Subject to any disclaimer, the term of this patent is extended or adjusted under 35 U.S.C. 154(b) by 317 days.

(21) Appl. No.: 16/893,521

(22) Filed: Jun. 5, 2020

(51) Int. Cl.
| | | |
|---|---|---|
| *F03G 7/08* | (2006.01) | |
| *H02K 7/116* | (2006.01) | |
| *H02K 7/18* | (2006.01) | |
| *F16H 21/40* | (2006.01) | |
| *F16H 7/06* | (2006.01) | |
| *H02K 7/10* | (2006.01) | |

(52) U.S. Cl.
CPC ............. *F03G 7/083* (2021.08); *F03G 7/08* (2013.01); *F16H 7/06* (2013.01); *F16H 21/40* (2013.01); *H02K 7/1004* (2013.01); *H02K 7/116* (2013.01); *H02K 7/1853* (2013.01); *H02K 7/1861* (2013.01)

(58) Field of Classification Search
CPC ........... F03G 7/08; F03G 7/083; H02K 7/116; H02K 7/1853; H02K 7/1861
See application file for complete search history.

(56) References Cited

U.S. PATENT DOCUMENTS

| | | | | | |
|---|---|---|---|---|---|
| 1,916,873 A | * | 7/1933 | Wiggins | ..................... | F03G 7/08 290/1 R |
| 4,212,598 A | * | 7/1980 | Roche | ..................... | F04B 35/00 417/478 |
| 4,238,687 A | * | 12/1980 | Martinez | ................... | F03G 7/08 290/1 R |
| 4,239,975 A | * | 12/1980 | Chiappetti | ................ | F03G 7/08 290/1 R |
| 4,250,395 A | * | 2/1981 | Lundgren | ............ | H02K 7/1853 290/1 R |
| 4,980,572 A | * | 12/1990 | Sen | ........................... | F03G 7/08 290/1 R |
| 6,204,568 B1 | * | 3/2001 | Runner | ..................... | F03G 7/08 290/1 R |
| 6,353,270 B1 | * | 3/2002 | Sen | .......................... | F03G 7/08 290/1 R |
| 6,494,144 B1 | * | 12/2002 | Perez Sanchez | ......... | F03G 7/08 104/287 |
| 6,767,161 B1 | * | 7/2004 | Calvo | ....................... | F03G 7/08 290/1 R |
| 6,858,952 B2 | * | 2/2005 | Gott | .......................... | F03G 7/08 290/1 R |

(Continued)

*Primary Examiner* — Tulsidas C Patel
*Assistant Examiner* — Thomas K Quigley
(74) *Attorney, Agent, or Firm* — Lawrence G. Fridman, Esq; FEIGIN & FRIDMAN, LLC

(57) ABSTRACT

A system is provided for generating electrical energy from passage of a vehicle over a road surface. The system comprises a pressure receiver connected to a rotatable shaft associated with a primary transmission unit. The pressure receiver is adapted for swinging motion over the road surface, so that upon pressure being applied to the pressure receiver by the moving vehicle the receiver swings in the direction of vehicle movement, wherein kinetic energy of vehicle motion is transferred to the shaft resulted in its rotation causing operation of a primary energy transmission unit consisting of the driving sprocket and a driven sprocket-follower wheel assembly which is coupled by a leading transmission arrangement an electrical generator.

5 Claims, 3 Drawing Sheets

(56) References Cited

U.S. PATENT DOCUMENTS

| | | | | |
|---|---|---|---|---|
| 7,067,932 B1* | 6/2006 | Ghassemi | | F03G 7/08 290/1 R |
| 7,145,257 B2* | 12/2006 | Ricketts | | F04B 35/01 290/1 R |
| 8,070,379 B2* | 12/2011 | Zana | | E01F 13/08 290/1 R |
| 8,466,570 B2* | 6/2013 | Kennedy | | H02K 7/07 290/1 R |
| 9,212,653 B2* | 12/2015 | Saavedra | | H02K 7/1853 |
| 2004/0130158 A1* | 7/2004 | Kenney | | F04B 17/00 290/1 R |
| 2005/0253459 A1* | 11/2005 | Cole | | F03G 7/08 307/10.1 |
| 2006/0021835 A1* | 2/2006 | Kimes | | F16D 41/12 192/46 |
| 2007/0201947 A1* | 8/2007 | Rastegar | | E01F 13/123 404/10 |
| 2009/0058099 A1* | 3/2009 | Ghassemi | | H02N 2/18 290/4 B |
| 2009/0127865 A1* | 5/2009 | Valentino | | B60L 50/30 320/108 |
| 2009/0179433 A1* | 7/2009 | Kenney | | F01D 17/26 290/1 R |
| 2010/0133855 A1* | 6/2010 | Daya | | F03G 7/08 290/1 R |
| 2011/0084500 A1* | 4/2011 | Kennedy | | F03G 7/08 290/1 R |
| 2011/0115236 A1* | 5/2011 | Blevins | | H02K 7/1807 290/1 C |
| 2011/0148121 A1* | 6/2011 | Kenney | | F03G 7/08 290/1 R |
| 2011/0298222 A1* | 12/2011 | Bailey | | H02K 7/1853 290/1 R |
| 2012/0068473 A1* | 3/2012 | Gohmann | | H02K 7/1853 404/1 |
| 2013/0173443 A1* | 7/2013 | Mansfield | | G06Q 50/06 705/37 |
| 2013/0300132 A1* | 11/2013 | Almalki | | F03D 9/25 290/4 R |
| 2014/0367973 A1* | 12/2014 | Saavedra | | G09F 15/0087 290/55 |
| 2015/0042100 A1* | 2/2015 | Saavedra | | F03D 5/06 290/55 |
| 2016/0065034 A1* | 3/2016 | Saavedra | | F03D 13/20 290/55 |
| 2020/0195723 A1* | 6/2020 | Bass | | G08G 1/0145 |
| 2020/0403485 A1* | 12/2020 | Giannotta | | E01C 1/00 |
| 2022/0049441 A1* | 2/2022 | Giannotta | | H02J 15/007 |
| 2022/0052582 A1* | 2/2022 | Giannotta | | H02J 15/007 |

* cited by examiner

RENEWABLE ELECTRICITY GENERATING SYSTEM

FIELD OF THE DISCLOSED TECHNOLOGY

The present invention relates in general to the field of renewable electric energy power sources, and in particular it is directed to a system for generating electrical energy from the passage of a vehicle over a road surface.

BACKGROUND OF THE DISCLOSED TECHNOLOGY

The consumption of electrical power has undergone a rapid increase in recent years. In this respect, in the United States and all over the world, the increase in the application and usage of computers, as well as hybrid and electric cars, has created a demand for more electric power plants in general, and in particular created demand for a localized power plants generating electricity in a particular area. The present invention discloses a renewable electric power system, where the source of energy is basically free. In the electric power generating system of the invention, kinetic energy and momentum of vehicles moving over a road (e.g., automobiles and trucks) constitute a practically free source of energy, where cars and trucks are moved by the power of their engines. The invention provides the kinetic energy power system for generation of electricity which is based on the translation of a moving mass of a vehicle and the gravity of their mass into mechanical and rotational motion, which is utilized to drive an electrical power generator.

The major advantages of the invention is not only in utilization of the free energy of moving vehicles which is otherwise wasted, but also in the fact that the disclosed electrical energy generation system can be installed without major investments practically on any straight or downhill sections of a road in the close vicinity to the energy consumers.

SUMMARY OF THE DISCLOSED TECHNOLOGY

One aspect of the invention provides a system for generating electrical energy from the passage of a vehicle thereover. The system comprises at least one generating device having a pressure receiving assembly installed over the road surface. The assembly includes a pressure receiver connected to a rotatable driver shaft proximate a roadway surface on which the vehicles travel and a restoring arrangement. The shaft extends between distal and proximal ends, wherein the restoring arrangement provided at the distal end and the proximal end is associated with a primary transmission unit. The pressure receiver extends outwardly from the shaft and is adapted for swinging/rotational motion over the road surface, so that upon pressure being applied to the pressure receiver by the moving vehicle the receiver swings/rotates in the direction of vehicle movement, so that a kinetic energy of the vehicle motion is transferred to the shaft and is resulted in operation of the primary gear transmission unit, ultimately energizing an electrical generator.

As to another aspect of the invention, the rotatable driver shaft is positioned over the road surface transversely to direction of the vehicle traffic movement allowing the vehicle traffic to move freely over the designated area of the road.

As to a further aspect of the invention, the pressure receiver is an elongated plate extending along the shaft, so as to be separated from the restoring arrangement provided at the distal end and spaced from the primary gear transmission at the proximal end. The restoring arrangement is selected from the group including a spring actuated, hydraulic or electrical device provided at the distal end of the shaft, As to yet another aspect of the invention the primary energy transmission unit is composed of the driving sprocket and a driven sprocket-follow wheel assembly coupled by a transmission arrangement to perform transmission of a mechanical power. The driven sprocket—follow wheel assembly consists of a driven sprocket unit and the follow wheel, with the driven sprocket unit being formed with a substantially hollow housing and a leading drum rotatably disposed within the housing interior. The leading drum is formed with multiple longitudinal sockets/recesses having, multiple drive rollers rotatable within the sockets/recesses. The leading drum with the driving rollers protruding slightly above its exterior cylindrical surface is rotatably positioned within a housing interior.

As to a further aspect of the invention upon rotational motion being transferred to the driven sprocket by the transmission, the leading drum connected with the driven sprocket begins its rotation relative to the housing, so that the drive rollers retained by the sockets/recesses are pulled out and wedged between an inner area/surface of the housing having the groves and the recesses of the drum. In this manner, the housing rotatable simultaneously with the driven sprocket and the drum, transmits a torque to the follow wheel, to ultimately transfer rotational motion through a transmission to energize the electrical generator.

BRIEF DESCRIPTION OF THE DRAWING

The invention is illustrated by way of example and not limitation in the figures of the accompanying drawings, in which like reference numerals indicate corresponding, analogous or similar elements. Further, there considered appropriate, reference numerals may be repeated among the figures to indicate corresponding or analogous elements.

DETAILED DESCRIPTION OF THE DISCLOSED TECHNOLOGY

Figure 1:
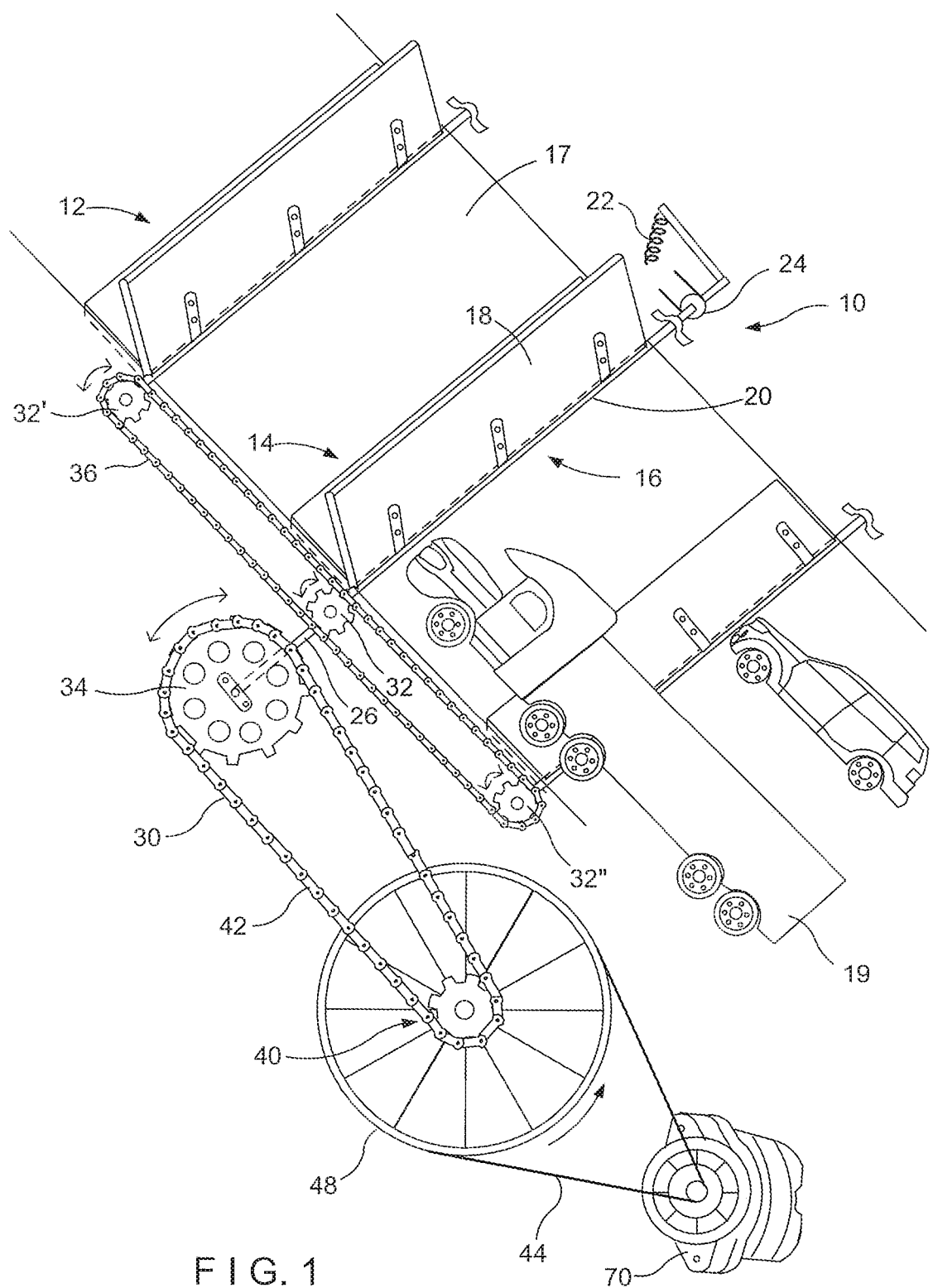
FIG. 1 is a schematic diagram of a system of the invention, which can be also used to carry out a method of the invention.

Attention is initially directed to FIG. 1, which diagrammatically illustrates an embodiment of a system 10 is installed over a straight or downhill section of a road 17 which can be disposed in the close vicinity to the energy consumers. The kinetic energy based electrical energy generation system 10 of the invention consists of at least one or multiple generating devices 12. Each generating device includes a driver unit 14 which comprises a pressure receiving assembly 16 installed over the section 17 of the road surface. The pressure receiving assembly 16 consists of a pressure receiver 18 connected to a rotatable driver shaft 20 and a restoring arrangement 22. The shaft extends between distal 24 and proximal 26 ends, wherein the restoring arrangement 22 is provided at the distal end and the proximal end 26 is connected to or associated with a primary gear transmission unit 30. The pressure receiver 18 extends outwardly from a substantial length of the shaft 20, so as to be spaced from and not to interfere with operation of the primary gear transmission unit 30.

In one embodiment the pressure receiver 18 is an elongated plate extending along the shaft 20, so as to be separated from the restoring arrangement 22 provided at the distal end and it is also spaced from the primary gear transmission 30 at the proximal end.

As illustrated in FIG. 1 the rotatable driver shaft 20 is positioned over the road surface 17 transversely to the direction of the vehicle traffic movement. In one embodiment, the driver shaft 20 is disposed below the road surface allowing the vehicle traffic to move freely over the designated area of the road. In the alternate embodiment the driving shaft 20 is disposed in flush with or extending slightly outwardly from the road surface.

Figure 2:
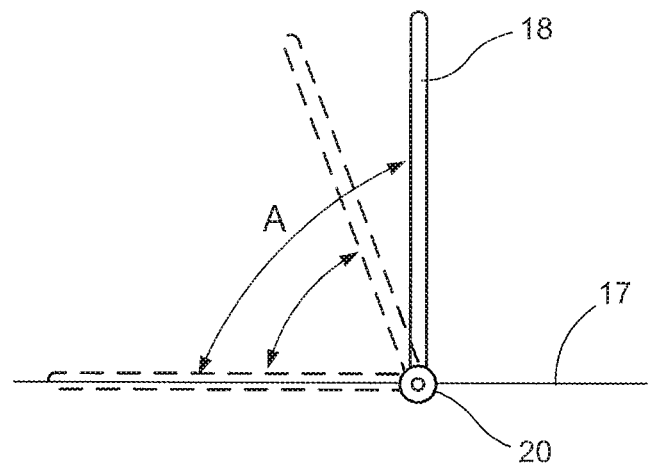
FIG. 2 is a diagram illustrating various positions of the pressure receiver.

In the initial working position, see FIG. 2 the pressure receiving plate 18 supported by the shaft 20 is positioned at a predetermined angle A to the road surface 17. Although the angle A can vary significantly, in the preferred embodiment it is within the range between 45-90 degrees. The angle A formed between the pressure receiver or plate 18 and the road surface 17 is designed to have a value according to predetermined angular swinging speed of the vehicle.

In use the pressure receiving pate 18 supported by the shaft 20 is adapted for swinging/rotational motion over the road surface. In this manner, upon pressure being applied to the pate 18 by the moving vehicle 19, it swings/rotates in the direction of the vehicle movement. Thus, kinetic energy of this motion is transferred to the shaft 20 and is translated into or resulted in the operation of the primary gear transmission unit 30. The swinging motion/movement of the plate 18 continues until the moving vehicle 19 passes the section road 17 accommodating the driving shaft and the plate of the respective energy generating device. In actuality the swinging angular motion of the receiving plate ranges from the plate being initially positioned at the angle A, when a contact between the plate and the vehicle is initiated, to the plate 18 being substantially flat at the road surface, after the vehicle passes the predetermined road section. After that the restoring arrangement 22 returns the receiving plate 18 to its initial position at the predetermined angle A to the road surface.

In one embodiment of the invention the restoring arrangement 22 is a spring actuated device provided at the distal end 24 of the shaft. For example, the restoring arrangement 22 can employ a compressed, leaf or any other springs capable of generating the required restoring force. Such restoring force should be capable of rotating the shaft 20 back, so as to bring the pressure receiving plate 18 from the position being practically flat to its initial position at the predetermined angle A. The restoring force of the restoring arrangement 22 is determined according to the angular swinging speed motion of the plate 18. Although the restoring arrangement 22 in the form of the spring actuated device is discussed in the application, it should be obvious to a person skilled in the art that any conventional arrangement capable of returning the pate to its original angular orientation is in the scope of the invention. For example, the restoring arrangement 22 can be hydraulic, electrical or any other suitable device.

The proximal end 26 of the driver shaft is provided with spaced from each other an external gear wheel 32 and a driving sprocket/wheel 34 forming a part of the primary energy transmission unit 30 provided to ultimately convert the swinging angular motion of the pressure receiver plate 18 into rotation of the electrical generator 70.

The primary energy transmission unit 30 is composed of the driving sprocket wheel 34 and a driven sprocket-follower wheel assembly 40 coupled/interconnected by a transmission arrangement 42 to perform transmission of the mechanical power. In the embodiment illustrated In FIG. 1, a flexible chain is used as the transmission arrangement 42. On the other hand, the transmission arrangement 42 may be selected from the group including, but not limited to, variable speed transmission, belt drive, chain drive, worm gearing, friction drive and transmission gearing. Other types of the transmission means are also within the scope of the invention.

Figure 3:
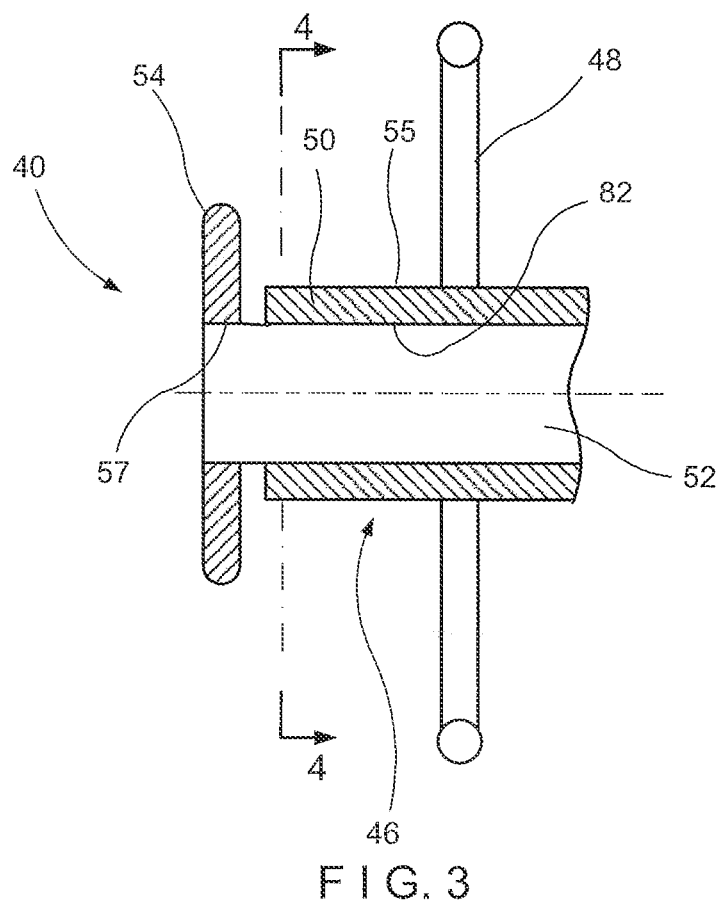
FIG. 3 is a semi-sectional view of a driven sprocket-follower wheel assembly.
Figure 4:
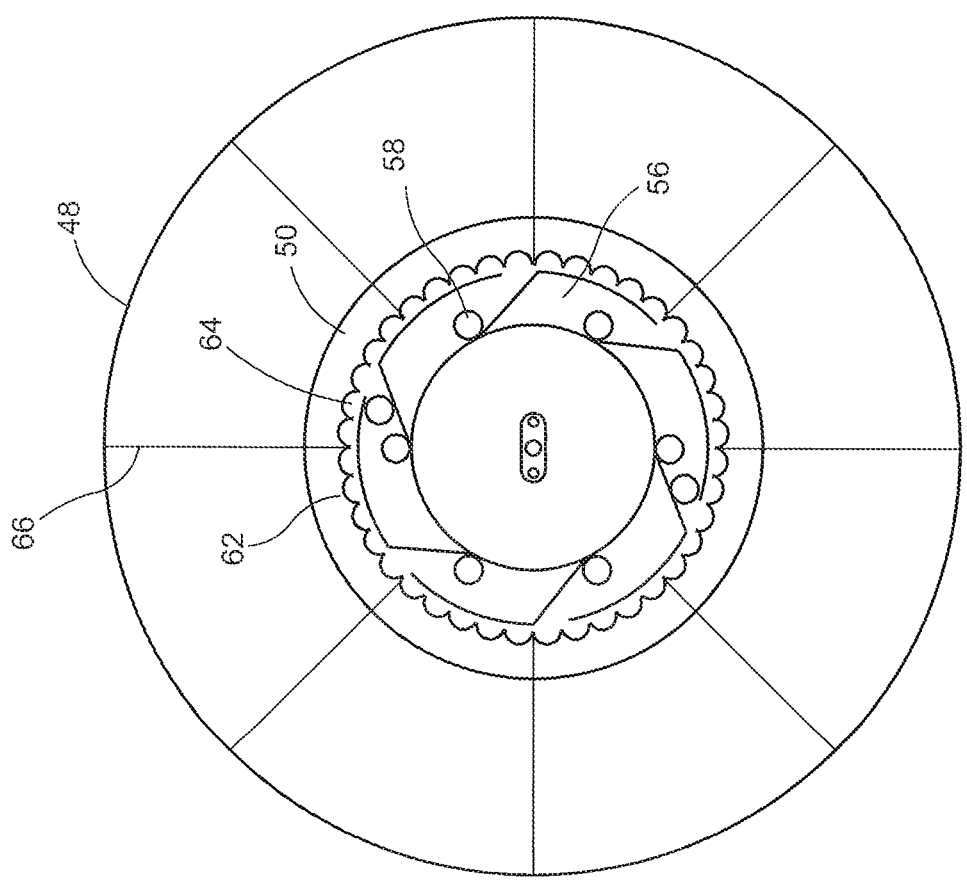
FIG. 4 is a section view according to section line 4-4 of FIG. 3.
Figure 5:
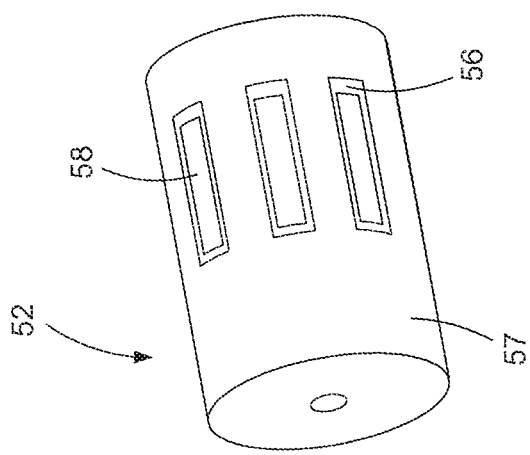
FIG. 5 is a view of the leading drum.

As more specifically illustrated in FIGS. 3-5 the driven sprocket—follower wheel assembly 40 consists of a driven sprocket unit 46 and the follower wheel 48. The driven sprocket unit 46 consists of a substantially hollow housing 50 and a leading drum 52 rotatably disposed within the housing interior. The driven sprocket 54 is fixedly disposed at an exterior 57 of the leading drum 52. The follower wheel 48 is fixedly positioned at the exterior 55 of the housing 50. The leading drum 52 having substantially cylindrical exterior 57 is formed with multiple shaped longitudinal sockets/recesses 56, the bottom of which may have a spiral configuration. Multiple drive rollers 58, having axes parallel to the axis of the drum can freely roll/rotate within the sockets/recesses 56. The leading drum with the driving rollers 58 protruding slightly above its exterior cylindrical surface 57 is rotatably positioned within the housing interior 62 formed with circumferentially arranged the inner recesses 64.

In use when the rotational motion is transferred to the driven sprocket 54 by the primary transmission 30, the leading drum 52 connected with the driven sprocket 54 begins its rotation relative to the housing 50. In this motion, the drive rollers 58 held by the sockets/recesses 56 of the drum, are pulled out and wedged between the inner area/surface 62 of the housing having the groves 64 and the nests/recesses 56 of the drum. This may be enhanced by the influence of the spiral surfaces of the recesses in the drum. Significant friction forces occur at the contact points between the rollers 58 and the inner surface 62 of the housing, pressing the rollers 58 into the groves 64, firmly adhering the housing to the leading drum.

In this engaged position between the housing and the drum, the housing 50 rotates simultaneously with the driven sprocket 54 and the drum 52 as a unitary structure. In one embodiment through the connecting members/spokes 66 the torque is transmitted to the exterior rim of the follower wheel 48, to ultimately transfer through the leading transmission 44 rotational motion to energize the electrical generator 70. In another embodiment the follower wheel is solid. In this manner the working mode of the assembly is carried out.

Upon passage of the designated road area by the respective vehicle 19 operation is not interrupted and continues to move but inertia. At this junction, the housing body overtakes the stopped leading drum 64 with the rollers 69 sitting in their sockets/recesses 67 during its rotation. The rollers 58, turning slightly around their own axes, are wedged and slide freely from the groves 64 of the housing into deeper places in the recesses 56 of the drum. The drum 52 and housing 50 are disconnected.

Accordingly the unidirectional rotation the driving sprocket/wheel 34 is transmitted into the rotational movement to the driven sprocket—follower wheel. assembly 40 via the transmission arrangement 42. The assembly 40 by means of the leading transmission arrangement 44 associated with the follower wheel 48 outputs the rotational motion to the electro-magnetic generator 70. The closed loop transmission arrangement 44 may be readily implemented by means of a chain and sprocket arrangement. The circumference or perimeter of the follower wheel 48 is coupled to rotationally engage the electrical generator 70. Thus, the swinging motion/action of the pressure receiving plate 18, in response to the vehicle 19 traversing the energy generating device 12 positioned over the road surface 17, will cause rotation of the wheel 48 over a prescribed arcuate distance around the circumference thereof, thereby rotating the closed loop leading transmission 44. Since the follower wheel 48 is rotationally engaged with the electrical generator 70, swinging/angular movement of the pressure receiving plate ultimately causes production of electrical energy.

Although a single generating device 12 with the driver unit 14 has been discussed above, as illustrated in FIG. 1 the energy generating system 10 may comprise a combination of multiple generating devices each having its own driver unit 14 which are arranged in the spaced from each other manner along the road surface 17. As further illustrated in FIG. 1 each driver unit 14 is formed with its own pressure receiving assembly 16 consisting of a pressure receiver 18 connected to a rotatable driver shaft 20 and a restoring arrangement 22. The proximal end 26 of each driver shaft is provided with its own external gear 32. The individual generating devices 12 and the driver units 14 are combined into one system. In the illustrated embodiment the external gears 32, 32' and 32" of each generating device are combined into the system by the auxiliary closed loop transmission arrangement 36. In this manner the torque or rotational motion of each generating devices 12 is combined into one system by the auxiliary transmission 36, so that a combined kinetic energy is provided to generate enhanced torque for primary transmission 30 and for ultimate driving of the generator 70. The auxiliary transmission 36 may be implemented by means of a chain or any other conventional arrangement.

In the above-discussed system 10 kinetic energy and momentum of a single vehicle 19 moving over a road by the power of its engines has been utilized to energize the electro-magnetic energy generating device 70. On the other hand, as also illustrated in FIG. 1, repeated engagements of the energy generated devices 12 by additional vehicles 19 passing over the road section 17 will be resulted in repeated rotation of the shafts 20 and swinging motion of the pressure receiving plates 18 which by means of the primary transmission 30 cause ultimate rotation of the follower wheel 48 and energizing the generator 70. The above discussed system 10 allows counterclockwise rotation of the follower wheel 48. On the other hand, the system with clockwise rotation of the follower wheel 48 is within the scope of the invention.

According to a further embodiment of the present invention the system is integrated with a traffic velocity regulator. The flow of traffic and the amount of electricity that needs to be generated will determine the number of the generators 70 (and the respected number of generating devices 12 required and their exact position on traffic lanes in the road section 17.

According to some embodiments of the invention, multiple vehicles 19 passing one after another transfer a small amount of its kinetic energy to the system 10, ensuring, with the use of energy generating devices 12 a smooth and constant rotation of the rotor of the electrical generator(s) 70. This results in a stable and permanent electricity generation.

According to some embodiments of the invention the electromagnetic generator 70 is a generator standard to the art. The electricity generated by this operation is then transferred, using traditional technology and components (i.e. batteries, regulators, DC motors etc.), to connected streetlights or any other electric power appliance or holding station. Alternative connectivity method is based on synchronized regulator that enables a direct connection of generated electricity to power grid, via a bi-directional power meter. Using the present system acts as a "power station", while generated power is credited to the system's owner.

It should be clear from the above that the present invention provides free source the renewable electric power energy generating system, wherein the kinetic energy and momentum of vehicles 19 moving over the road 17 constitute a practically free source of energy, since the vehicles are moved by the power of their engines. The kinetic energy power system for generation of electricity of the Invention which is also based on the translation of a moving mass of a vehicle and the gravity of their mass into mechanical and rotational motion, which is utilized to drive an electrical power generator. An important advantage of the invention is that the disclosed electrical energy generation the system can be installed practically on any straight or downhill sections of a road in the close vicinity to the energy consumers.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. An above ground system for generating electrical energy from a vehicle moving over a road surface, said system consisting of multiple generating devices, a single auxiliary close loop transmission arrangement, and a primary energy transmission unit;

wherein each said generating device has a pressure receiving assembly installed over the road surface, said pressure receiving assembly including a pressure receiver connected to a rotatable driver shaft, said rotatable driver shaft being positioned proximate to the road surface and configured to extend longitudinally between a distal end and a proximal end;

wherein said distal end is provided with a restoring arrangement and said proximal end is provided with an external gear, said external gear being connected to the external gear of the other generating devices by said single auxiliary closed loop transmission arrangement;

wherein the proximal end of a selected rotatable driver shaft is further provided with a driving sprocket that is spaced apart from the external gear of the selected rotatable driver shaft;

wherein a driven sprocket and a follower wheel are combined to form a single driven sprocket-follow wheel one way assembly;

wherein said driving sprocket and said driven sprocket are coupled with a transmission arrangement to form said primary energy transmission unit;

wherein said single driven sprocket-follow wheel one way assembly further comprises a hollow housing having an interior and exterior, said housing interior comprising a plurality of circumferentially arranged inner grooves and said housing exterior having said follower wheel fixedly attached thereto;

wherein a leading drum having interior and exterior portions is disposed partially within and configured to rotate with respect to said housing interior, said exterior portion having said driven sprocket fixedly attached thereto;

wherein said leading drum is formed with multiple recesses having multiple drive rollers rotatably disposed within said recesses;

wherein, when in use, the rotational motion generated by said generating device is transmitted to said driven sprocket via said single auxiliary close loop transmission arrangement causing the leading drum connected to said driven sprocket to rotate relative to the housing and the drive rollers to be pulled to a respective opening of the multiple drum recesses;

wherein the multiple drive rollers engage with the circumferentially arranged inner grooves of the housing interior at a plurality of respective contact points;

wherein frictional forces occurring at the contact points press the rollers firmly against the housing in an engaged position such that said housing rotates simultaneously with said driven sprocket and said leading drum;

wherein said primary energy transmission unit and said single driven sprocket-follow wheel one way assembly transmit a torque generated by said system to an exterior rim of said follower wheel;

wherein said exterior rim transfers the torque and the rotational motion of the system to energy a single electric generator.

2. The system of claim 1, wherein the pressure receiver is an elongated plate extending along the shaft, so as to be separated from the restoring arrangement provided at the distal end and spaced from the primary gear transmission at the proximal end.

3. The system of claim 1, wherein the restoring arrangement is selected from the group consisting of spring actuated, hydraulic or electrical devices provided at the distal end of the shaft.

4. The system of claim 1, wherein each said drive roller has an axis parallel to an axis of the drum.

5. The system of claim 1, wherein each said rotatable shaft is positioned transversely to a direction of a vehicle traffic movement allowing the vehicle traffic to move freely over a designated area of the road surface.

\* \* \* \* \*